United States Patent
Hui et al.

(10) Patent No.: US 9,510,264 B2
(45) Date of Patent: Nov. 29, 2016

(54) REGION-BASED ROUTE DISCOVERY IN REACTIVE ROUTING NETWORKS

(75) Inventors: Jonathan W. Hui, Belmont, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 521 days.

(21) Appl. No.: 13/538,238

(22) Filed: Jun. 29, 2012

(65) Prior Publication Data

US 2013/0250809 A1   Sep. 26, 2013

Related U.S. Application Data

(60) Provisional application No. 61/614,703, filed on Mar. 23, 2012.

(51) Int. Cl.
| | |
|---|---|
| *H04L 12/28* | (2006.01) |
| *H04W 40/02* | (2009.01) |
| *H04W 40/28* | (2009.01) |
| *H04W 40/20* | (2009.01) |
| *H04L 12/721* | (2013.01) |
| *H04L 12/715* | (2013.01) |

(52) U.S. Cl.
CPC .......... *H04W 40/023* (2013.01); *H04W 40/28* (2013.01); *H04L 45/32* (2013.01); *H04L 45/46* (2013.01); *H04W 40/20* (2013.01)

(58) Field of Classification Search
None
See application file for complete search history.

(56) References Cited

U.S. PATENT DOCUMENTS

| | | | |
|---|---|---|---|
| 5,943,317 A | * | 8/1999 | Brabson et al. ............. 370/238 |
| 6,132,306 A | | 10/2000 | Trompower |
| 6,732,163 B1 | | 5/2004 | Halasz |
| 6,961,323 B1 | | 11/2005 | Xu et al. |
| 7,177,295 B1 | | 2/2007 | Sholander et al. |

(Continued)

FOREIGN PATENT DOCUMENTS

| | | |
|---|---|---|
| EP | 2548342 A1 | 1/2013 |
| WO | WO-2011/115679 | 9/2011 |

OTHER PUBLICATIONS

Finnie, et al., "Notification of Transmittal of the International Search Report and the Written Opinion of the International Searching Authority, or the Declaration", Patent Cooperation Treaty, International Appl. No. PCT/US2013/033470, mailed Jun. 25, 2013, 12 pages, European Patent Office, Rijswijk, Netherlands.

(Continued)

*Primary Examiner* — Ayaz Sheikh
*Assistant Examiner* — Sori Aga
(74) *Attorney, Agent, or Firm* — Parker Ibrahim & Berg LLC; James M. Behmke; Stephen D. LeBarron

(57) ABSTRACT

In one embodiment, a region anchor node may receive a unicasted route request (RREQ) for a target node. The region anchor node may then flood the RREQ to a region within which it resides. Subsequently, the region anchor node may receive one or more reactive routing route replies (RREPs) returned by the target node within the region. Based on the RREPs, the region anchor node may build one or more region routes from the region anchor node to the target node, and returns the one or more region routes to the originator node to cause the originator node to concatenate the one or more region routes and the unicast route of the original RREQ to form a path from the originator node to the target node.

17 Claims, 13 Drawing Sheets

(56) References Cited

U.S. PATENT DOCUMENTS

| | | | |
|---|---|---|---|
| 7,385,988 B2 | 6/2008 | Asati | |
| 7,398,310 B1 | 7/2008 | Kuehl et al. | |
| 7,424,268 B2 | 9/2008 | Diener et al. | |
| 7,515,542 B2 | 4/2009 | Hertoghs et al. | |
| 7,542,414 B1 | 6/2009 | Katukam | |
| 7,606,335 B2 | 10/2009 | Kloper et al. | |
| 7,634,536 B2 | 12/2009 | Halasz | |
| 7,684,411 B2 | 3/2010 | Asati | |
| 7,729,290 B2 | 6/2010 | Saleh et al. | |
| 7,787,361 B2 | 8/2010 | Rahman et al. | |
| 7,826,454 B2 | 11/2010 | Polk et al. | |
| 7,826,463 B2 | 11/2010 | Patel et al. | |
| 7,826,560 B2 | 11/2010 | Raleigh et al. | |
| 7,840,217 B2 | 11/2010 | Patel et al. | |
| 7,848,224 B2 | 12/2010 | Bryant et al. | |
| 7,869,350 B1 | 1/2011 | Bryant et al. | |
| 7,899,027 B2 | 3/2011 | Castagnoli et al. | |
| 7,965,642 B2 | 6/2011 | Shand et al. | |
| 7,978,725 B2 | 7/2011 | Gong et al. | |
| 7,983,174 B1 | 7/2011 | Monaghan et al. | |
| 1,023,157 A1 | 9/2011 | Vasseur et al. | |
| 8,068,411 B2 | 11/2011 | Vasseur et al. | |
| 8,068,840 B2 | 11/2011 | Patel et al. | |
| 8,125,911 B2 | 2/2012 | Patel et al. | |
| 8,179,801 B2 | 5/2012 | Previdi et al. | |
| 8,308,509 B2 | 11/2012 | Karam | |
| 8,363,662 B2 | 1/2013 | Thubert et al. | |
| 8,374,092 B2 | 2/2013 | Previdi et al. | |
| 8,374,164 B2 | 2/2013 | Nadeau et al. | |
| 8,392,541 B2 | 3/2013 | Agarwal et al. | |
| 2003/0033394 A1* | 2/2003 | Stine | 709/222 |
| 2003/0204623 A1 | 10/2003 | Cain | |
| 2003/0204625 A1* | 10/2003 | Cain | 709/243 |
| 2006/0072602 A1 | 4/2006 | Achanta | |
| 2006/0215583 A1 | 9/2006 | Castagnoli | |
| 2007/0206547 A1 | 9/2007 | Gong et al. | |
| 2009/0285213 A1* | 11/2009 | Chen et al. | 370/392 |
| 2011/0228696 A1 | 9/2011 | Agarwal et al. | |
| 2013/0034031 A1* | 2/2013 | Sherman | H04W 40/26 370/310 |

OTHER PUBLICATIONS

Haas, et al., "The Zone Routing Protocol (ZRP) for Ad Hoc Networks", Internet Draft, draft-ietf-manet-zone-zrp-03.txt, Mar. 2000, 48 pages, The Internet Engineering Task Force Trust.

Kum, et al., "An Efficient On-Demand Routing Approach with Directional Flooding for Wireless Mesh Networks", Journal of Communications and Networks, vol. 12, No. 1, Feb. 2010, pp. 67-73, Seoul, Korea.

Li, et al., "ABRP: Anchor-Based Routing Protocol for Mobile Ad Hoc Networks", Wireless Personal Communications, vol. 42, No. 2, Aug. 16, 2006, pp. 277-300, Kluwer Academic Publishers.

Ochi, et al., "An Extended AODV Routing for Reduction of Control Messages in Ad Hoc Networks", Consumer Communications and Networking Conference, Jan. 2007, 5 pages, Institute of Electrical and Electronics Engineers.

Pozzi, et al., "Notification of Transmittal of the International Search Report and the Written Opinion of the International Searching Authority, or the Declaration", Patent Cooperation Treaty, International Appl. No. PCT/US2013/033478, mailed Jun. 26, 2013, 12 pages, European Patent Office, Rijswijk, Netherlands.

Singh, et al., "Enhanced AODV Routing Protocol with paging in Heterogeneous IP-Based Networks", Wireless Communications and Networking Conference, Apr. 18, 2010, 6 pages, Institute of Electrical and Electronics Engineers, Piscataway, NJ.

Sucec, et al., "A Query Scope Agent for Flood Search Routing Protocols", Wireless Networks, The Journal of Mobile Communication, vol. 9, No. 6, Nov. 2003, pp. 623-636, Kluwer Academic Publishers, The Netherlands.

Clausen, et al., "The LLN On-demand Ad hoc Distance-vector Routing Protocol—Next Generation (LOADng)", IETF Trust, Network Working Group, Internet Draft, draft-clausen-lln-loadng-02, Mar. 2012, 44 pages.

Clausen, et al., "The LLN On-demand Ad hoc Distance-vector Routing Protocol—Next Generation (LOADng)", IETF Trust, Network Working Group, Internet Draft, draft-clausen-lln-loadng-05, Jul. 2012, 57 pages.

Li, et al., "On-Demand Node-Disjoint Multipath Routing in Wireless Ad Hoc Networks", Proceedings of the 29th Annual IEEE International Conference on Local Computer Networks (LCN'04), IEEE Computer Society, Nov. 2004, pp. 419-420.

Sambasivam, et al., "Dynamically Adaptive Multipath Routing Based on AODV", IEEE Communications Magazine 1, 205-217 (2002).

Sarma, et al., "A Multipath QoS Routing with Route Stability for Mobile Ad Hoc Networks", IETE Technical Review, vol. 27, No. 5, pp. 380-397, Sep. 2010.

Winter, et al., "RPL: IPv6 Routing Protocol for Low Power and Lossy Networks", draft-ietf-roll-rpl-19, IETF Internet-Draft; Mar. 2011, 164 pages.

Clausen, et al., "The LLN On-demand Ad hoc Distance-vector Routing Protocol—Next Generation (LOADng)", IETF Trust, Network Working Group, Internet Draft, draft-clausen-lln-loadng-04, Apr. 2012, 50 pages.

Vasseur, et al., "Techniques for Use in Reactive Routing Networks", U.S. Appl. No. 61/614,703, filed Mar. 23, 2012, 66 pages.

Winter; et al., "RPL: IPv6 Routing Protocol for Low-Power and Lossy Networks", Internet Engineering Task Force, Request for Comments 6550, Mar. 2012, 158 pages.

* cited by examiner

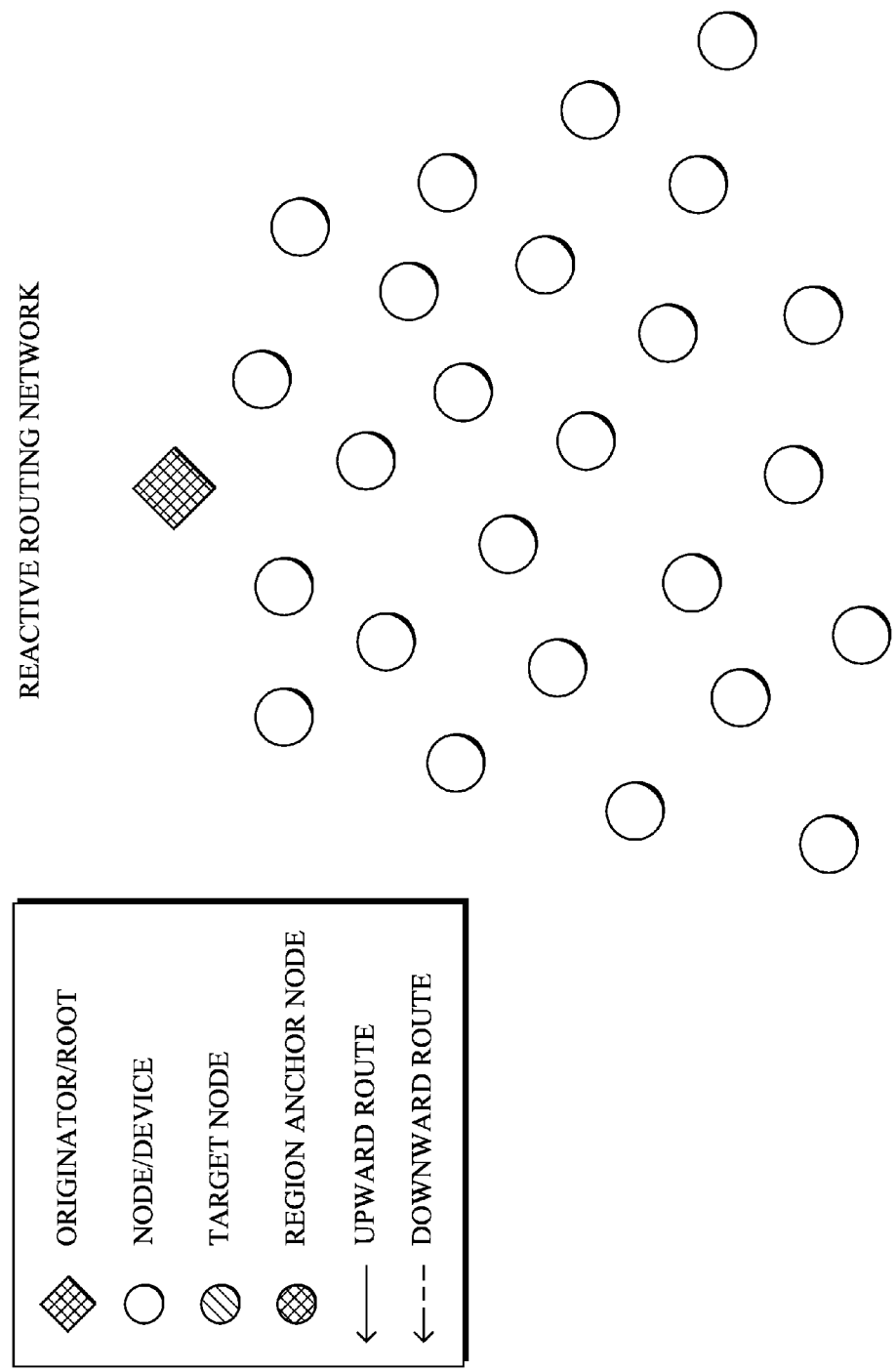

REGION-BASED ROUTE DISCOVERY IN REACTIVE ROUTING NETWORKS

RELATED APPLICATION

The present application claims priority to U.S. Provisional Patent Application No. 61/614,703, filed Mar. 23, 2012, entitled TECHNIQUES FOR USE IN REACTIVE ROUTING NETWORKS, by Vasseur, et al., the contents of which are hereby incorporated by reference.

TECHNICAL FIELD

The present disclosure relates generally to communication networks, and, more particularly, to reactive routing in communication networks.

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. Routing in LLNs is undoubtedly one of the most critical challenges and a core component of the overall networking solution. Two fundamentally and radically different approaches, each with certain advantages and drawbacks, have been envisioned for routing in LLN/ad-hoc networks known as:

1) Proactive routing: routing topologies are pre-computed by the control plane (e.g., IS-IS, OSPF, RIP, and RPL are proactive routing protocols); and 2) Reactive routing: routes are computed on-the-fly and on-demand by a node that sends discovery probes throughout the network (e.g., AODV, DYMO, and LOAD are reactive routing protocols), usually driven by user packets to be sent over the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3I illustrate an example of region-based route discovery; and

DESCRIPTION OF EXAMPLE EMBODIMENTS

Overview

Figure 1:
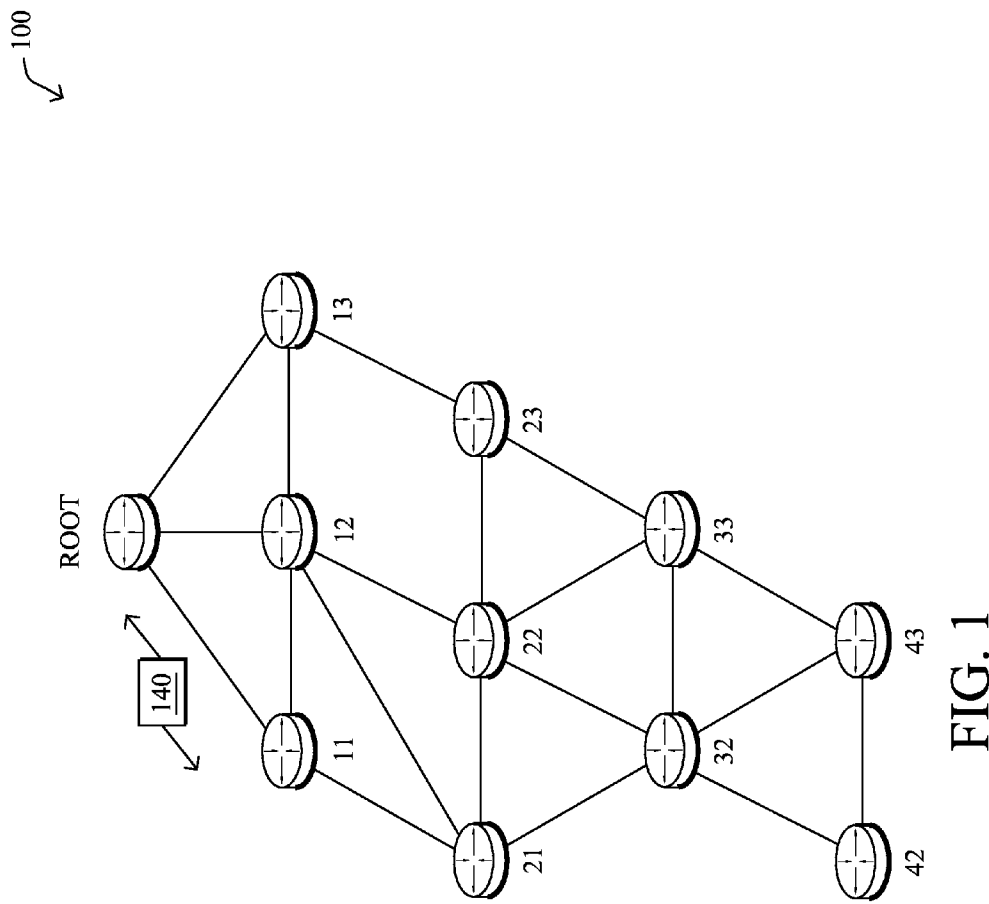
FIG. 1 illustrates an example communication network.

According to one or more embodiments of the disclosure, a region anchor node may receive a route request (RREQ) for a target node, the RREQ being unicast by an originator node to the region anchor node via a unicast route. The region anchor node may be configured to communicate with the originator node and a region of the computer network comprising one or more nodes that are proximate to the region anchor node. The region anchor node may then flood the RREQ to the region within which it resides. Subsequently, the region anchor node may receive one or more reactive routing route replies (RREPs) returned by a target node within the region. Based on the RREPs, the region anchor node may build one or more region routes from the region anchor node to the target node, and returns the one or more region routes to the originator node to cause the originator node to concatenate the one or more region routes and the unicast route to form a path from the originator node to the target node. In this manner, the region anchor node may act as an intermediary between the root and particular regions of the network, which dramatically decreases the control overhead required to discover and establish downward routes from the root to a particular node/device within a reactive routing network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
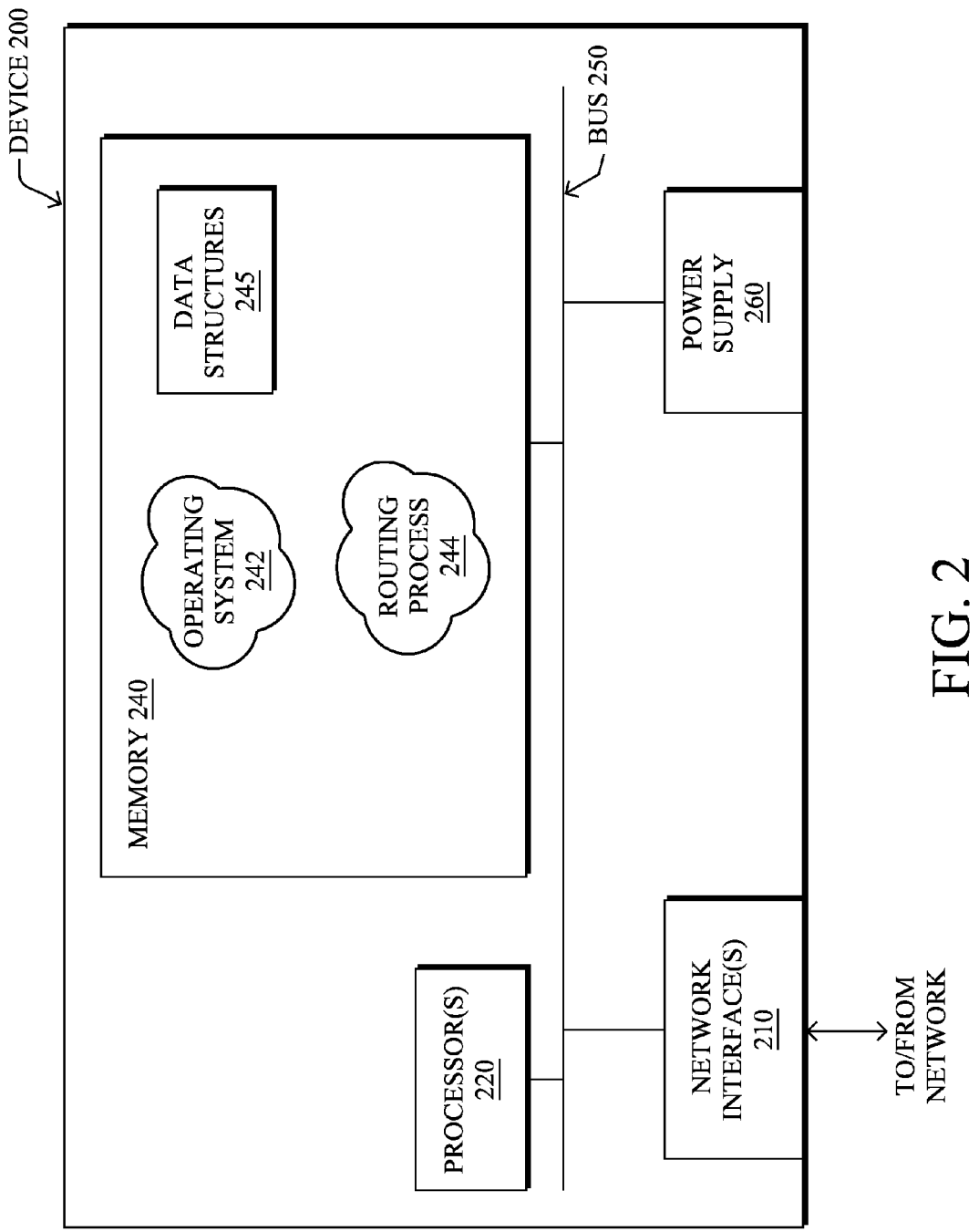
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing process 244, as described herein. Note that while the routing process 244 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of networks in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

As noted above, routing in LLNs is undoubtedly one of the most critical challenges and a core component of the overall networking solution. Two fundamentally and radically different approaches have been envisioned for routing in LLN/ad-hoc networks known as proactive routing (routing topologies are pre-computed by the control plane) and reactive routing (routes are computed on-the-fly and on-demand by a node that sends a discovery probes throughout the network).

An example proactive routing protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Directed Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

An example reactive routing protocol is specified in an IETF Internet Draft, entitled "The LLN On-demand Ad hoc Distance-vector Routing Protocol—Next Generation (LOADng)"<draft-clausen-lln-loading-04> by Clausen, et al. (Apr. 22, 2012 version), provides a reactive routing protocol for LLNs, e.g., as derived from AODV. Other reactive routing protocol efforts include the G3-PLC specification approved by the ITU, and also one described in an informative annex of IEEE P1901.2.

One stated benefit of reactive routing protocols is that their state and communication overhead scales with the number of active sources and destinations in the network. Such protocols only initiate control traffic and establish state when a route to a destination is unknown. In contrast, proactive routing protocols build and maintain routes to all destinations before data packets arrive and incur state and communication overhead that scales with the number of nodes, rather than the number of active sources and destinations. Some believe that reactive routing protocols are well-suited for certain Smart Grid Automated Meter Reading (AMR) applications where a Collection Engine reads each meter one-by-one in round-robin fashion. In such simplistic applications, only one source-destination pair is required at any point in time for a given traffic flow.

Reactive routing protocols, however, have a number of technical issues that are particularly exhibited in large-scale LLNs, such as large utility networks. It is thus important to have a robust solution for reactive routing. Therefore, various techniques are hereinafter shown and described for use with reactive routing networks to address such shortcomings.

Route Discovery Based on Dynamic Regions

A unique property of many LLN applications (e.g., Advanced Metering Infrastructure) is that traffic flows typically traverse the LLN Border Router (LBR). In particular, the vast majority of traffic within a LLN either flows from the LBR to a LLN node/device or from an LLN node/device to an LBR. Proactive routing protocols such as, for example, RPL, take advantage of this property by building destination oriented directed acyclic graphs (DODAGs) with the LBR serving as the root. By routing traffic upwards and downwards along the DODAG, the control and state costs of the LLN grow linearly with the number of devices rather than by the square.

In contrast, existing reactive routing protocols typically provide shortest-path routes between any particular source-destination pair. As a result, existing reactive routing protocols do not take advantage of the fact that the vast majority of traffic flows in a LLN converge on a LBR. Unfortunately, this has a tendency to create significant problems during the process of route establishment. For example, reactive routing protocols operate by flooding a Route Request (RREQ) message from a source node/device to solicit a Route Reply (RREP) from a destination node/device. Nodes/devices that process the RREQ and RREP messages may then configure a single route towards the source node/device of the message. In particular, whenever receiving a RREQ or RREP message with a larger sequence value or smaller path cost, a node/device may replace its current next-hop for the originator with the node/device that transmitted the RREQ or RREP message.

There is a fair amount of control overhead associated with proactive routing protocols. For example, RPL requires nodes to periodically send Destination Advertisement Object (DAO) messages in order to establish downward routes from the source node/device (e.g., a root) to each node. As a proactive routing protocol, all nodes in a RPL protocol environment are generally configured to send such DAO messages periodically. Unfortunately, the control overhead caused by such DAO messages increases linearly with the number of nodes. Consequently, when maintaining route state, there is a trade-off between the period of time used to refresh the downward route with a DAO message and the control overhead at the root. For example, in a typical Smart Grid AMI network, a root may be required to support 1,000 to 10,000 nodes, or more. In one mode, the RPL protocol may request that every node periodically send DAO messages to establish downward paths from the root. In another mode, the RPL protocol may request that nodes do not send DAO messages in the case where only upward paths to the root are required. However, the RPL protocol does not currently provide any efficient mechanism by which to selectively inform nodes to send DAO messages.

In contrast, existing reactive routing protocols discover a target destination by flooding a RREQ message, and since reactive routing protocols make no assumption about the network's topology, the RREQ message is generally flooded to all nodes in the network, which significantly increases network traffic. While reactive routing protocols such as AODV may specify an expanding ring search for RREQ message floods, such a mechanism is only useful when the destination (e.g., a target node) is topologically close to the source. When the source and destination are separated by a topologically significant distance, the expanding ring search only serves to further increase network control traffic.

The techniques herein provide region-based route discovery in reactive routing networks that may reduce control message overhead by minimizing the need to continuously flood the entire network with RREQ messages. For example, the techniques herein may effectively subdivide a computer network into distinct regions, which may or may not overlap with one another, and reactively trigger the nodes within a particular region that should transmit DAOs to the root. In particular, the techniques herein limit RREQ message flooding to particular regions of the network on an as needed basis, thus reducing control message overhead caused by DAOs and alleviating the sensitivity of reactive routing protocols to the number of nodes in the network.

Specifically, according to one or more embodiments of the disclosure as described in detail below, the techniques herein may allow a region anchor node to receive a route request (RREQ) for a target node, the RREQ being unicast by an originator node to the region anchor node via a unicast route. For example, the region anchor node may be located within an originator directed acyclic graph (DAG) in a computer network, which may be rooted at the originator node. The region anchor node may be configured to communicate with the originator node and a region of the computer network comprising one or more nodes that are proximate to the region anchor node. The region anchor node may then flood the RREQ to the region within which it resides. Subsequently, the region anchor node may receive one or more reactive routing route replies (RREPs) returned by a target node within the region. Based on the RREPs, the region anchor node may build one or more region routes from the region anchor node to the target node, and returns the one or more region routes to the originator node to cause the originator node to concatenate the one or more region routes and the unicast route to form a path from the originator node to the target node. In this manner, the region anchor node may act as an intermediary between the root and particular regions of the network, which dramatically decreases the control overhead required to discover and establish downward routes from the root to a particular node/device within a reactive routing network.

Illustratively, the techniques described herein may be performed by hardware, software, and/or firmware, such as in accordance with the routing process 244, which may contain computer executable instructions executed by the processor 220 (or independent processor of interfaces 210) to perform functions relating to the novel techniques described herein. For example, the techniques herein may be treated as extensions to conventional routing protocols, such as the various reactive routing protocols, and as such, may be processed by similar components understood in the art that execute those protocols, accordingly.

Operationally, the techniques herein may use proactive routing within a reactive routing network to establish upward routing state (e.g., routes from nodes/devices within the network to the root), while establishing downward routing state (e.g., routes from the root to nodes/devices within the network) by selectively informing nodes/devices within specific regions of the network. Advantageously, by using such a region-based approach, the RREQ message flood is limited to small regions in the network. This is in contrast to existing reactive routing approaches that flood the RREQ message (e.g., by using an expanding ring search) throughout the entire network. This also differs from existing reactive routing approaches that use the RREQ message to establish paths to the RREQ originator.

Notably, the techniques herein selectively establish downward routes from a common root, thus decoupling the control cost used for maintaining downward routes from the number of nodes in the network, and also minimizing the cost of establishing downward routes.

Figure 3B:
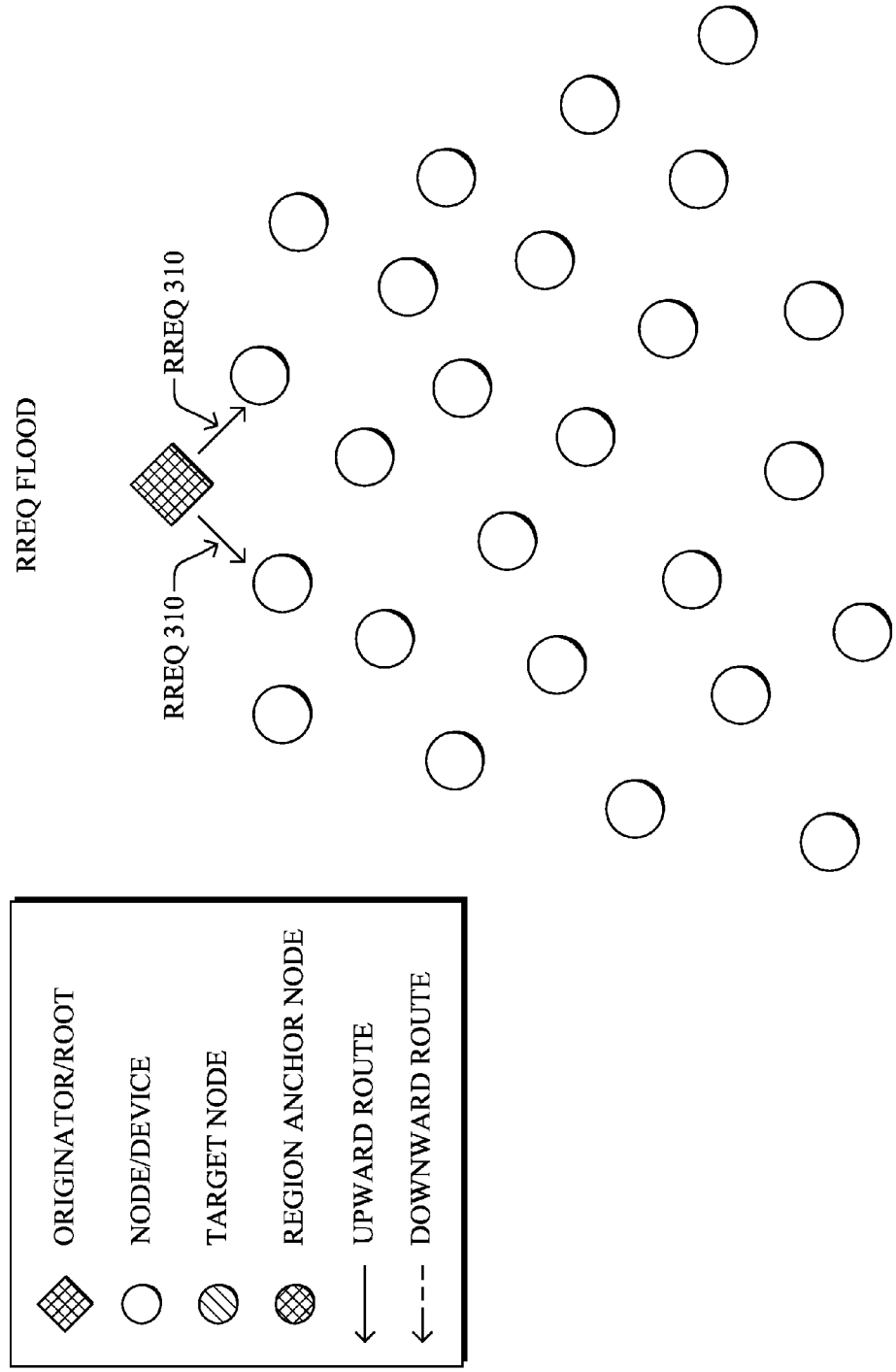
Figure 3C:
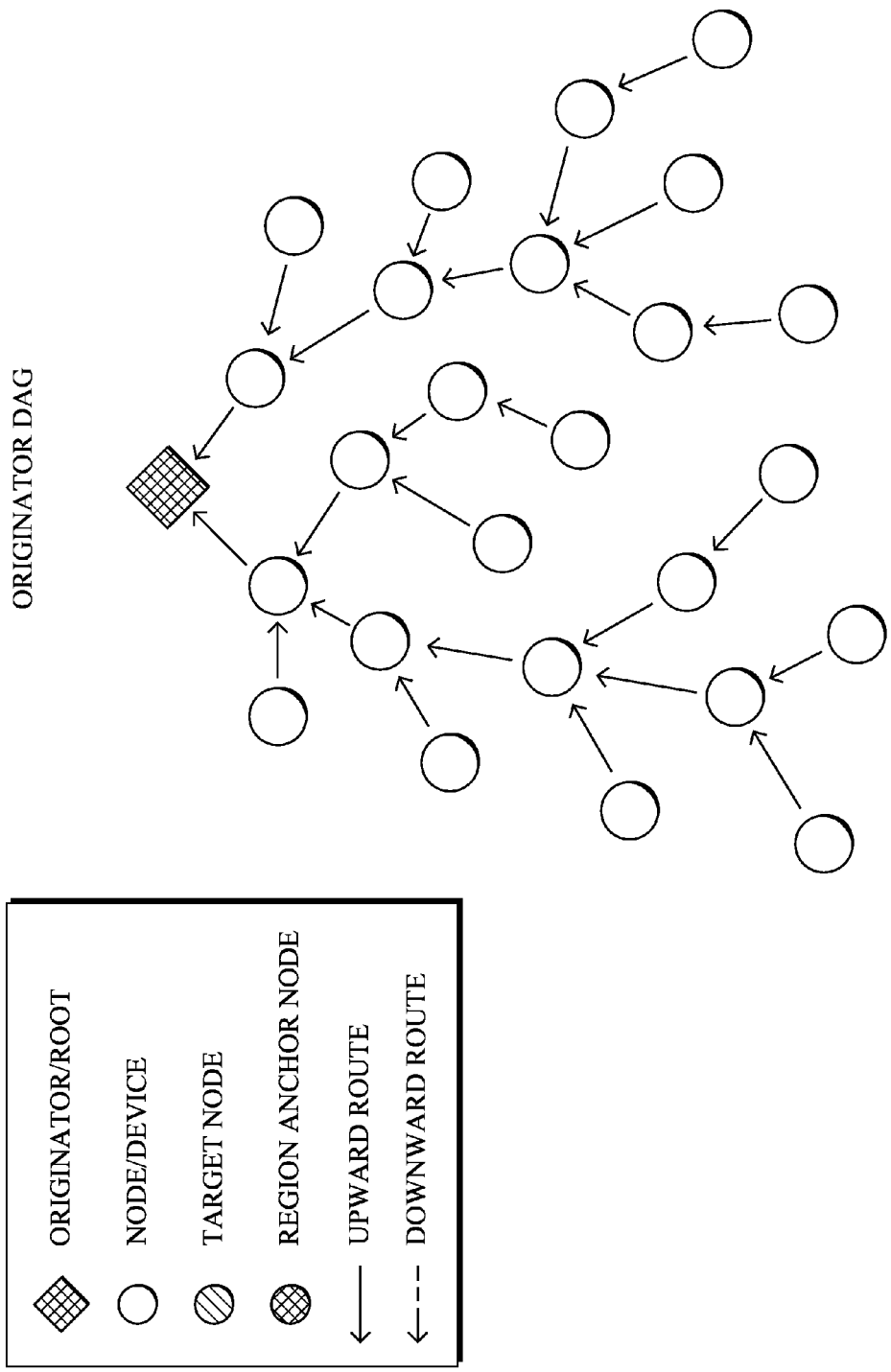

According to the techniques herein, a distance-vector routing protocol (e.g., RPL, DSDV, etc.) may be used to proactively establish upward routes from nodes/devices within a computer network to the root/originator (e.g., a DAG rooted at the LBR) by using RREQ messages to solicit RREPs from one or more nodes. For example, FIG. 3A illustrates a reactive routing network that includes an originator/root node in a plurality of additional notes/devices. As shown in FIG. 3B, the roots/originator node may initiate a RREQ flood, and the resulting RREPs from the plurality of nodes in the reactive routing network may establish a DAG, as shown in FIG. 3C, which establishes the upward routes within the network. It should be noted that the techniques herein do not require that the nodes processing a RREQ message update a routing state(s); rather, the nodes may simply forward the RREQ message if they have not seen the RREQ message previously. This is in contrast to existing reactive routing protocols in which the RREQ message is generally used solely to establish a route back to the source. Consequently, the route state maintenance overhead is significantly reduced relative to existing reactive routing protocols.

Notably, the use of a distance-vector protocol to establish upward routes to a common source in a reactive routing network may have a much lower cost than the use of a distance-vector protocol to establish downward routes because the control cost increases as a function of node density in the network, and not node number. Furthermore, nodes may only maintain a limited, fixed number (e.g., 1, 2, 3, etc.) of upward routes to the originator/root. By proactively building the upward routes, the techniques herein allow the originator DAG to be established and maintained over time, which has the benefit of increasing overall robustness of the DAG and reducing network latency when nodes within the network need to use the upward routes.

In addition, when the root needs to send a message to a node/device within the network, and the root does not have an established downward route to the node/device, it may send a RREQ message to discover the node. When the node/device receives the RREQ message, it may begin sending RREP messages back to the root via the upward route. Unlike the RREQ message, the RREP message may be used to establish downward paths towards the device. In one embodiment, the RREQ message may include a requested duration and/or period over which the destination node/device should send RREP messages. It should be noted that such messages may be reactive routing protocol specific. For example, in the case of RPL, DAO messages may be used for the RREP messages. While this aspect of the techniques herein has been described using some analogies to RPL, it is important to note that this aspect of the disclosure is not specific to RPL. Any routing protocol may be used to proactively establish upward routing state.

Figure 3D:
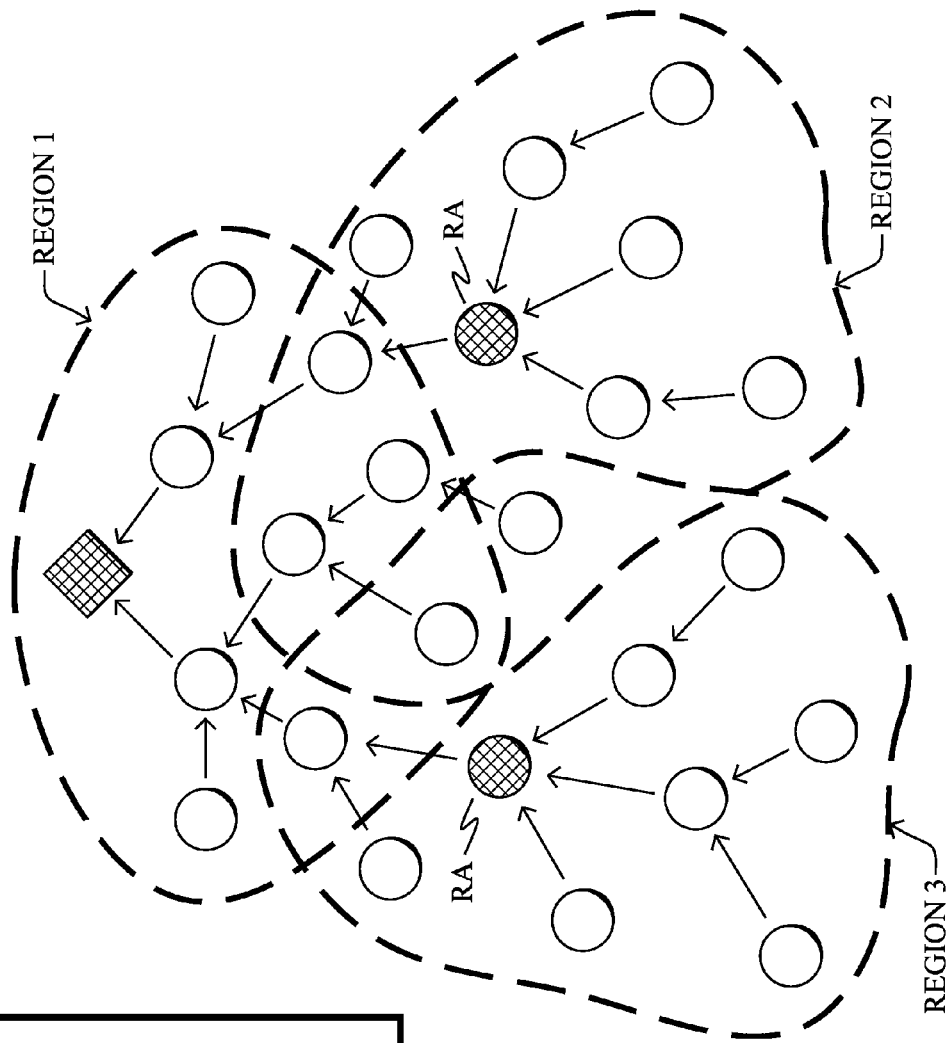
Figure 3D:
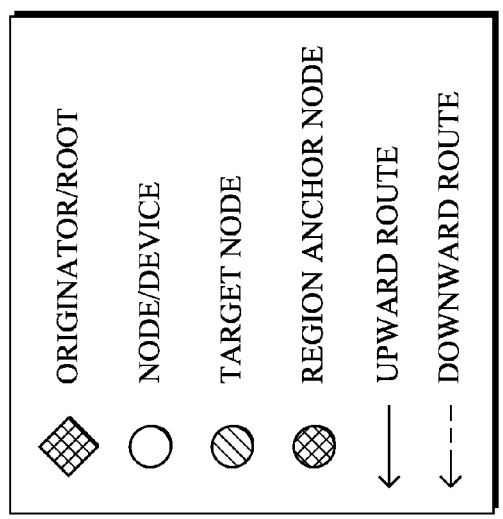
Figure 3E:
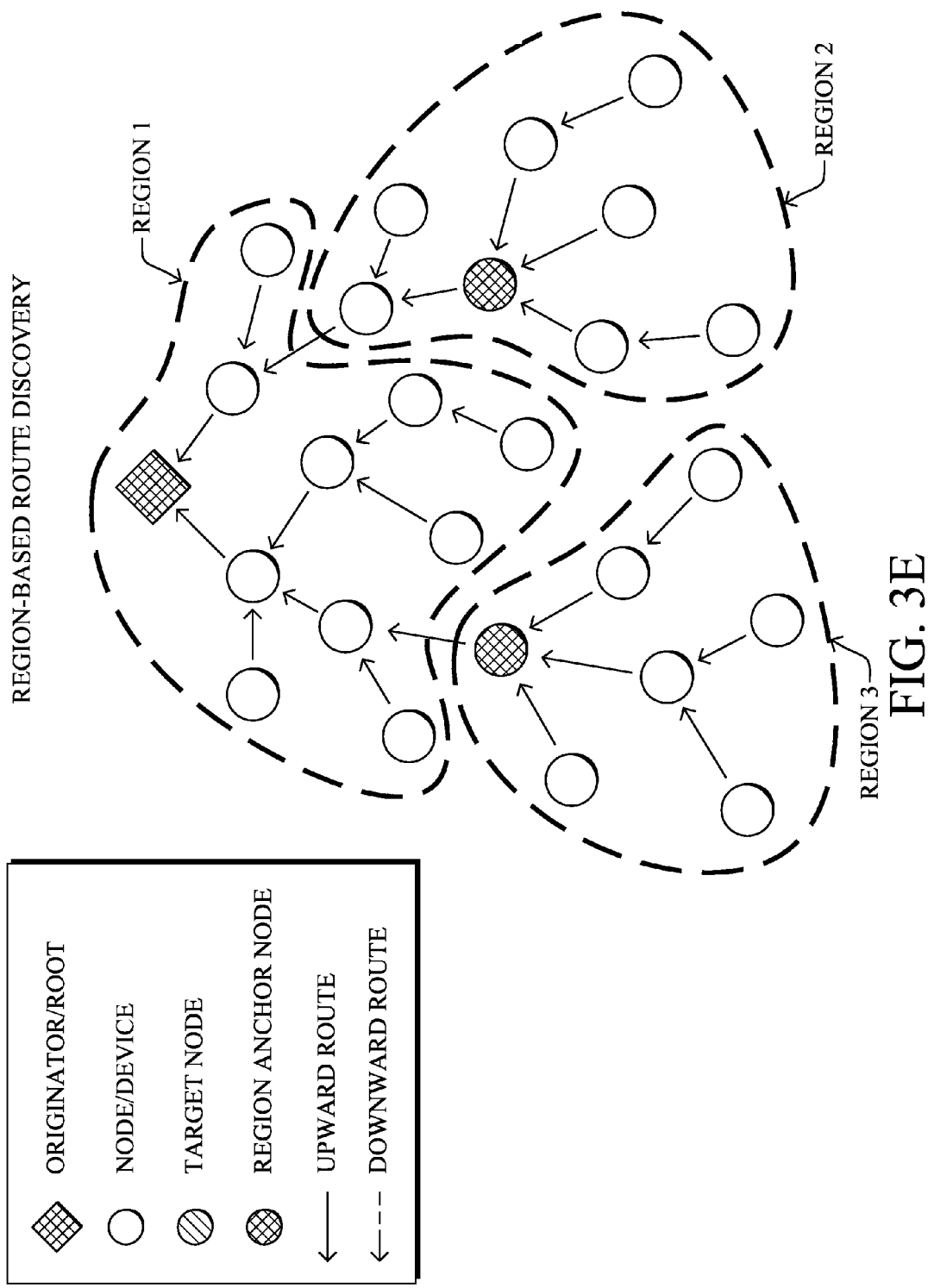

The techniques herein further provide a region-based route discovery approach, which is designed to limit the cost of route-discovery within a reactive routing network. For example, a small subset of nodes/devices in the network may be selected as Region Anchors (RAs), which effectively divide the reactive routing network into regions encompassing a limited number of nodes/devices that are in proximity to a particular Region Anchor. As shown in FIG. 3D, these regions may be overlapping, and the degree of overlap may be varied as appropriate for a particular function/application within a specific reactive routing network. In other words, each node may be covered by two or more regions to provide additional redundancy and robustness to topological changes. If the root sends a RREQ message to one region and does not receive a RREP after some time, it may attempt another region. Alternatively, these regions may also be non-overlapping, as shown in FIG. 3E.

Operationally, the RAs may act as intermediaries between the root node and notes/devices within a particular region. Illustratively, the root may send a RREQ to a note/device in a particular region by first sending the RREQ to a RA, which may then perform a scoped flood to search for the device within its region. By using RAs, the root may only need to maintain downward routing state for a small number of RAs. As a result, the techniques herein trade a small constant amount of control traffic to maintain downward routing state, while reducing significantly the cost and latency of sending a RREQ message.

According to the techniques herein, RAs may be established in a variety of ways. For example, in one embodiment of the disclosure, RAs may be selected by using historical topological information about the network that has been collected at the root. In another embodiment, the RAs may be selected in a distributed manner, in which RAs periodically send a newly defined advertisement within the scope of their region (e.g., scope may be defined by hops, or physical coordinates if they exist). In another embodiment, RA establishment/maintenance may auto-regulate. For example, if a node/device has not received an advertisement in a while, it may elect itself to become a RA. Conversely, if a RA detects the presence of too many RAs (e.g., based on some threshold or percentage of total nodes) within a given region, or network topology, the RA may elect to stop serving as an RA.

Operationally, when the RAs advertise themselves within a region, nodes/devices within the region may then establish routes from the RA to themselves, which has the advantage of potentially avoiding a RREQ flood even within the region. In another embodiment, the RA may selectively enable route establishment between itself and a node/device based on observed frequency or expected communication times with the node/device. In other words, the RAs may distribute (and thus reduce) the cost of sending RREPs to the root continuously. Illustratively, an optimal downward route may only be established when the root needs to reach a particular device.

According to the techniques herein, the root may use historical topological information to determine what region(s) a particular node/device is likely to be in. In another embodiment, node/devices may send a message to the root that indicates what region(s) they are in. Although this is similar to the process of sending a RREP, the overhead is much less because it is unlikely that a node/device will change the region with which it is associated, while it is quite likely that the downward path connecting the node/device to the root may be changed/altered over time. As a result, the region notification message may be sent with a much lower period than a message intended to maintain downward routing state.

Figure 3F:
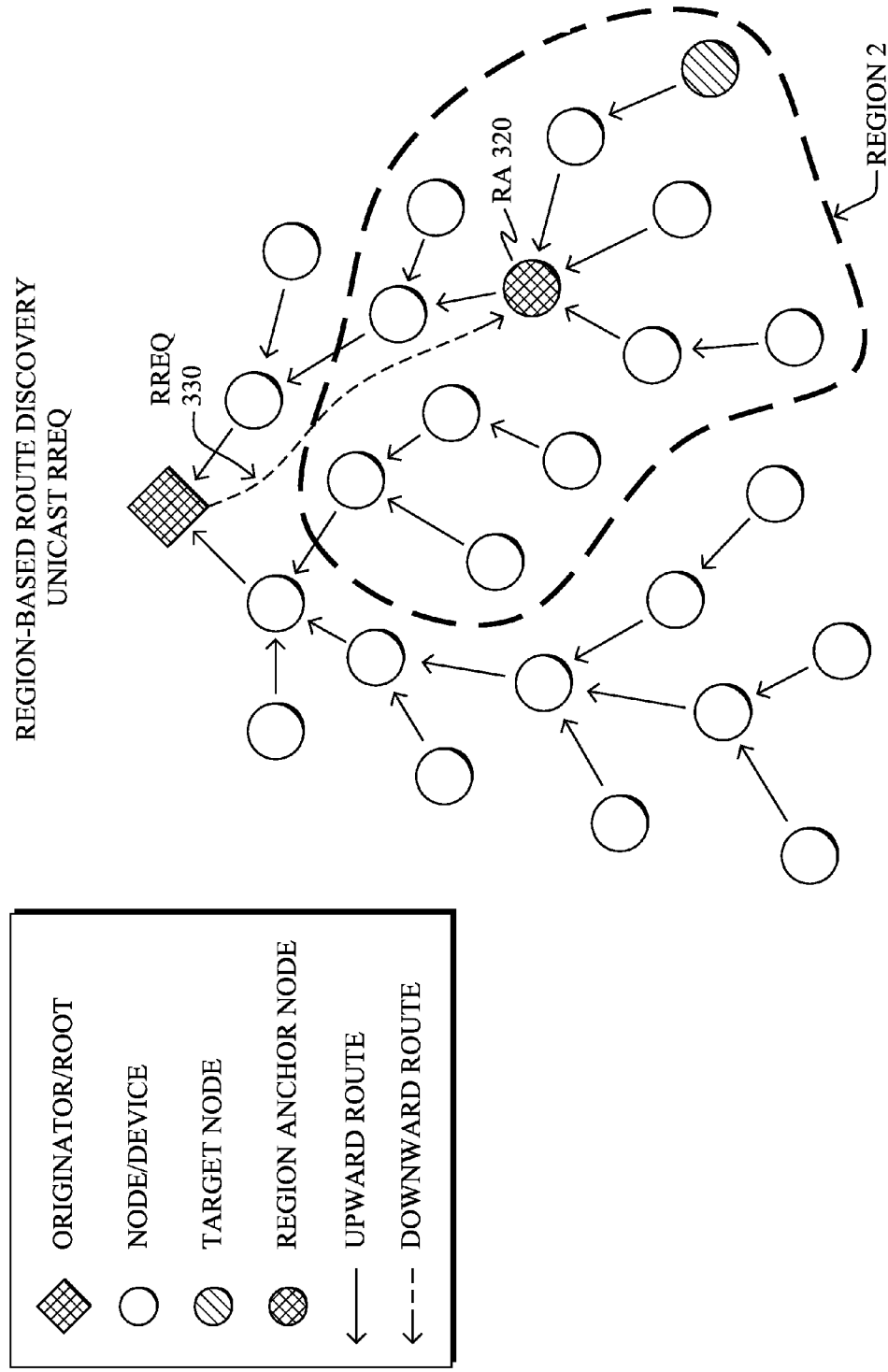
Figure 3G:
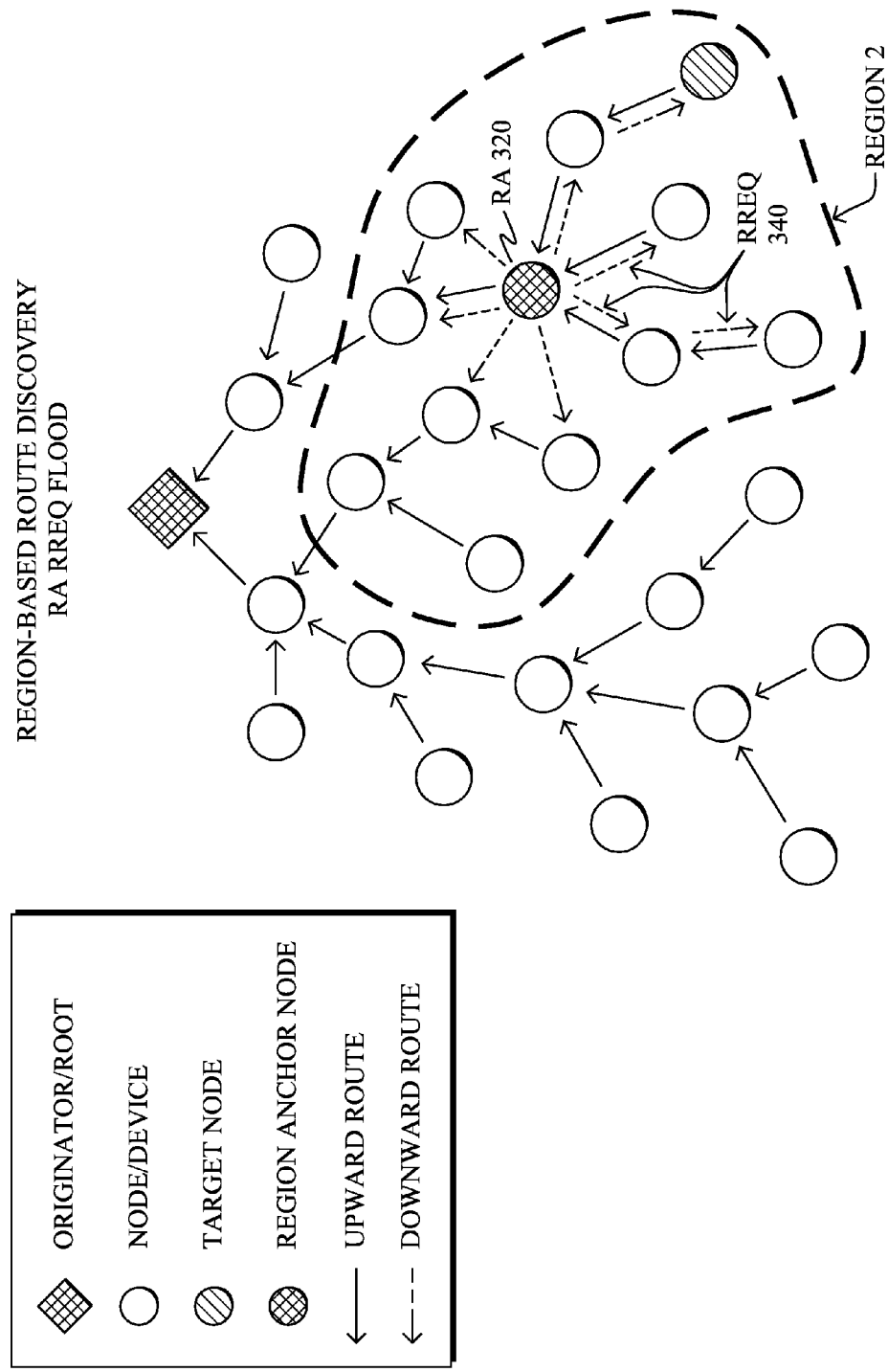
Figure 3H:
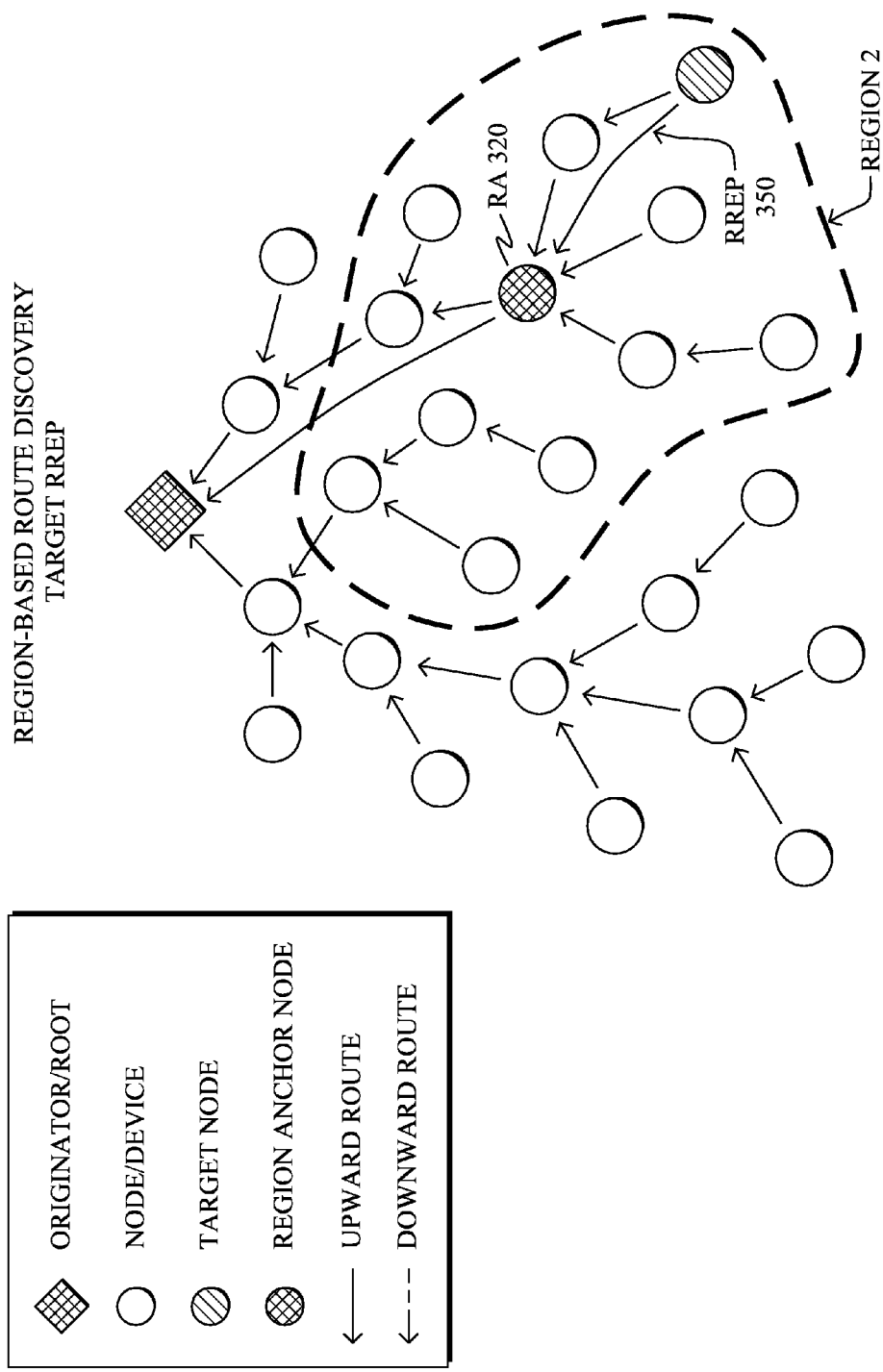
Figure 3I:
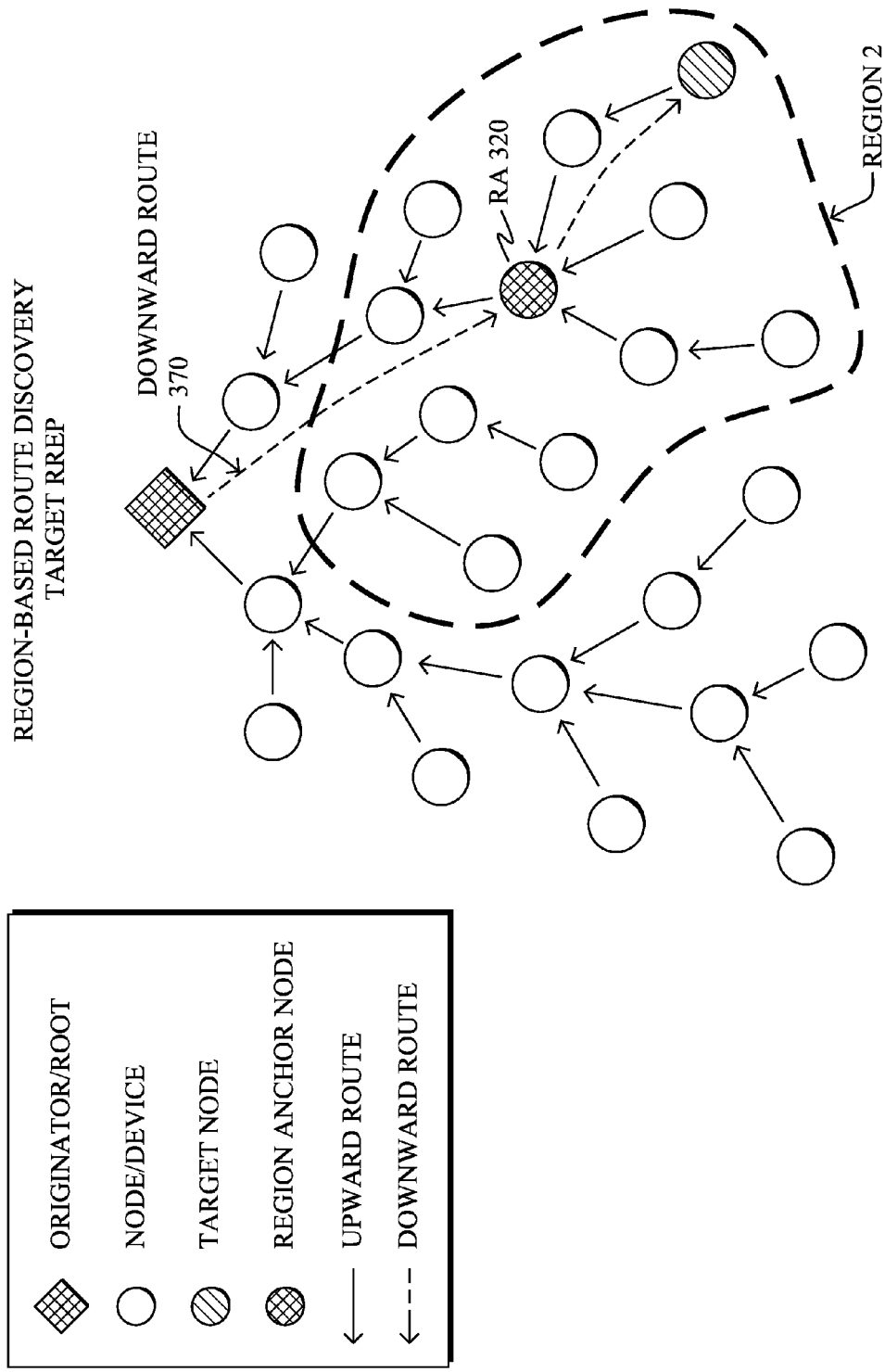

Operationally, region-based route discovery may occur as follows. For example, as shown in FIG. 3F, the root may unicast a RREQ 330 to RA 320. Upon receipt of RREQ 330, RA 320 may then flood a RREQ message 340 into region 2, as shown in FIG. 3G. FIG. 3H shows that upon receipt of RREQ message 340, the target node may then send a RREP back to RA 320, which effectively establishes a route from the RA to the target, and the RA may then send the RREP along the upward route to the route (i.e., the reverse of the unicast route). By concatenating the target-RA route with the RA-root route, a downward route 370 may be formed between the root and the target node in region 2. In other words, using the upward routes allows the downward routes to be optimal (i.e., path length may be no different than existing approaches such as RPL). It is contemplated within the scope of the disclosure that a number of mechanisms may be used to establish downward routing state (e.g., RPL DAO message, AODV RREP message, etc.).

It should be noted that the use of RAs according to the techniques herein may establish some frequency of non-optimal routes between the target node and the root; however, the techniques herein maintain downward routes to RAs and use them to deliver RREQ messages without having to flood an entire network, which provides a significant advantage over existing protocols, which require a flood of the entire network.

Figure 4:
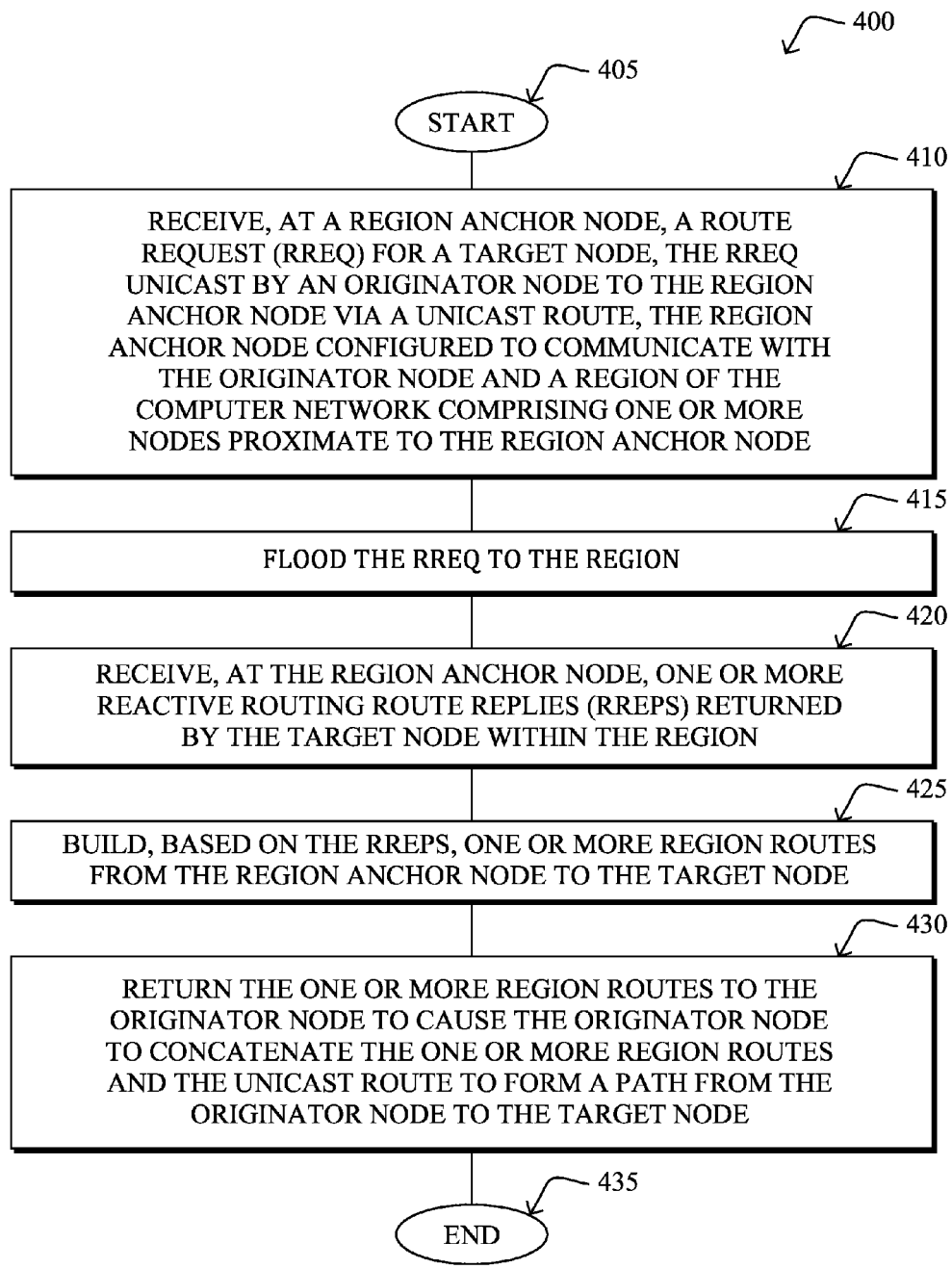
FIGS. 4-5 illustrate example simplified procedures for performing region-based route discovery in a reactive routing network.

FIG. 4 illustrates an example simplified procedure 400 for region-based route discovery in a reactive routing network in accordance with one or more embodiments described herein, particularly from the perspective of a region anchor node. The procedure 400 may start at step 405, and continues to step 410 where, as described above, a region anchor node may receive a route request (RREQ) for a target node, the RREQ being unicast by an originator node to the region anchor node via a unicast route. As noted, the region anchor node may be configured to communicate with the originator node and a region of the computer network comprising one or more nodes that are proximate to the region anchor node. As shown in step 415, the region anchor node may then flood the RREQ to the region within which it resides. Subsequently, as shown in step 420, the region anchor node may receive one or more reactive routing route replies (RREPs) returned by the target node within the region. Based on the RREPs, in step 425 the region anchor node may build one or more region routes from the region anchor node to the target node. As shown in step 430, the region anchor node may then return the one or more region routes to the originator node to cause the originator node to concatenate the one or more region routes and the unicast route to form a path from the originator node to the target node, and then the procedure 400 may illustratively end at step 435. In this manner, the region anchor node may act as an intermediary between the root and particular regions of the network, which dramatically decreases the control overhead required to discover and establish downward routes from the root to a particular node/device within a reactive routing network.

Figure 5:
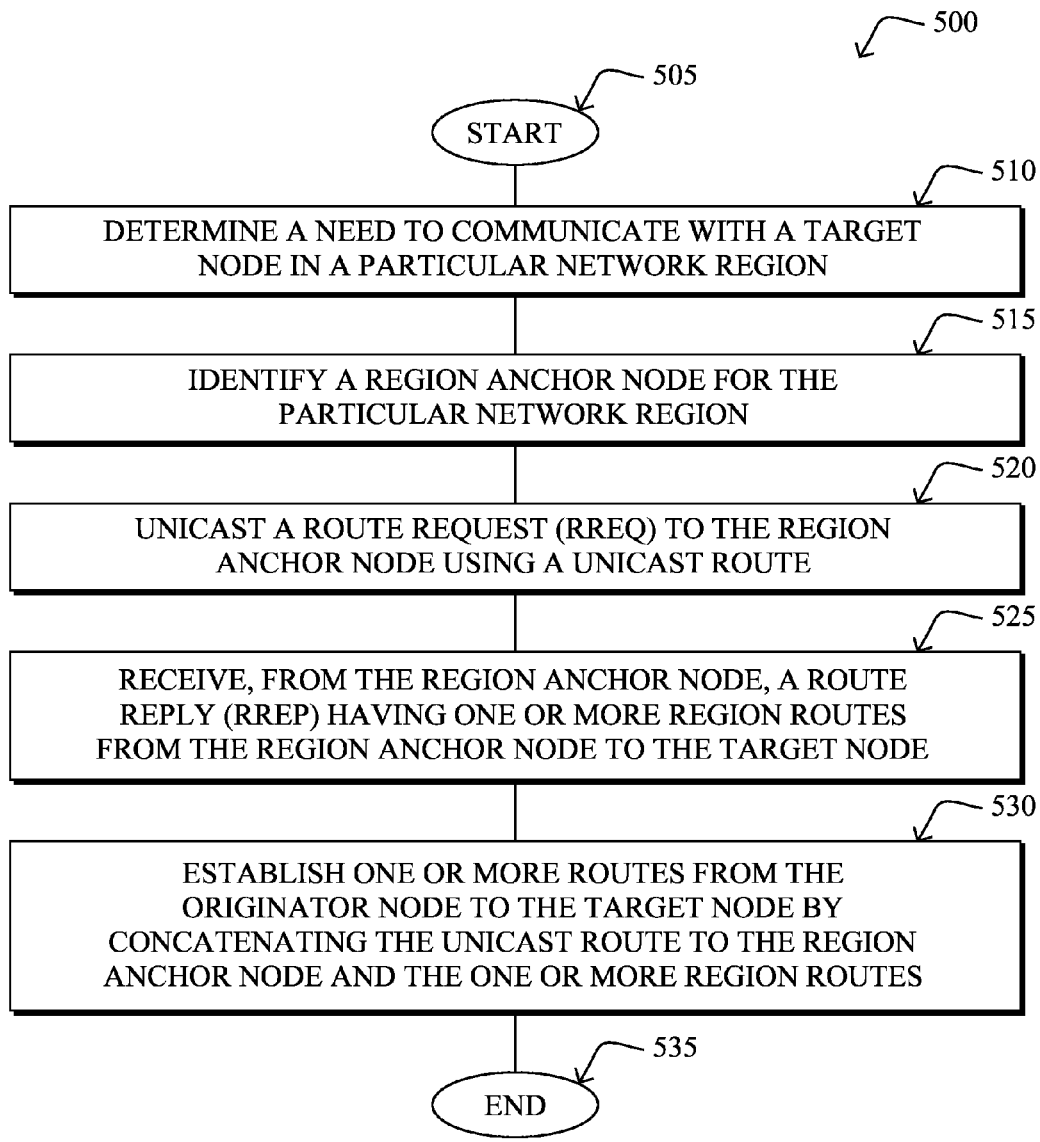

Further, FIG. 5 illustrates another example simplified procedure 500 for region-based route discovery in a reactive routing network in accordance with one or more embodiments described herein, particularly from the perspective of an originator node. The procedure 500 may start at step 505, and continues to step 510 where, as described above, the originator node may determine a need to communicate with a target node in a particular network region, and then in step 515 may identify a region anchor node for the particular network region. Accordingly, in step 520, the originator node may unicast a RREQ to the region anchor node using a unicast route (e.g., based on the originator DAG), and then may subsequently receive, from the region anchor node in step 525, a RREP having one or more region routes from the region anchor node to the target node. The originator node may then establish one or more routes from the originator node to the target node in step 530 by concatenating the unicast route to the region anchor node and the one or more region routes, and the procedure illustratively ends in step 535.

It should be noted that while certain steps within procedures 400-500 may be optional as described above, the steps shown in FIGS. 4-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The techniques described herein, therefore, provide for region-based route discovery in a reactive routing communication network. In particular, the techniques herein allow a source to selectively choose which devices may send RREP messages. By using a region-based approach to reach the target device, the RREQ flood is reduced to a small region of the network, so that both the cost and latency of reaching the target device with a RREQ and receiving a RREP may be reduced.

Notably, there have been significant efforts in using Connected Dominating Sets (CDS) for both reactive and protective routing protocols. A Dominating Set (DS) "D" of a graph "G" is one in which every vertex in G is either included in D or is adjacent to a vertex in D. A CDS represents a special-case DS in which there exists a path that utilizes only nodes in D between all pairs of nodes in D. Using CDS in networking may be especially attractive because it may produce a network overlay of reduced density that provides connectivity to all nodes in the network. A minimum CDS of a graph G may be a CDS with the smallest possible cardinality among all CDS sets of G. The minimum CDS problem may be NP-hard, even when the complete graph is known.

The techniques herein describe a method that may select a subset of devices, called Region Anchors (RA), which may function to limit the scope of flood-based discovery messages. While the RAs do represent a subset of devices, the set of RAs are neither a CDS nor a DS. In particular, the set of RAs do not form a connected graph since a RA may be separated by one or more devices from the nearest RA. Similarly, the set of RAs do not form a DS since a device not in the set of RAs may be separated by one or more devices from the nearest RA. By not requiring the RAs to form a CDS or a DS, the selection of RAs is much more flexible. Specifically, any arbitrary subset of devices in the network may be selected to serve as RAs. This provides the RA selection logic much more flexibility to include different factors. For example:

1) the proportion of devices selected to serve as RAs may represents a tradeoff between the number of devices to actively maintain routes for vs. the scope of the flood to discover devices that are not selected as RAs;
2) the density of RAs may be non-uniform, allowing some portions of the network to have a higher density of RAs to reduce the cost of flood discoveries while other portions of the network may have a lower density to reduce the cost of maintaining routes to RAs; and
3) the regions defined by each RA may overlap by varying degrees to provide a tunable amount of redundancy for discovering devices not selected as RAs.

In addition, the techniques herein differ from existing reactive routing protocols in that the RAs may be used to implement a scoped discovery mechanism localized to different portions of the network. Existing efforts perform all routing and forwarding functions using the CDS. Devices that are not a part of the CDS do not route or forward packets. It should be noted that the use of RAs and CDS with a routing protocol are not mutually exclusive. In fact, the RA and CDS mechanisms are complimentary. The CDS may be used to reduce the graph density to reduce overall routing protocol costs. A subset of devices in the CDS may be selected as RAs to discover devices that are either inside or outside the CDS.

The techniques described herein may provide for dynamically dividing broadcast domains (e.g., regions) to control flooding in a reactive routing communication network. In particular, the techniques herein may overcome the poor scalability of existing reactive routing protocols, which results from the massive flooding of discovery path probes (e.g., RREQs) in these networks. By using the region anchor nodes as a loose hop to help reach the final destination node, the techniques herein may reduce congestion in reactive routing networks. The techniques thus increase scalability both for an increase in the number of nodes in a network, and even in relatively small networks as the number of active P2P flows increases in the network.

While there have been shown and described illustrative embodiments of techniques for use with reactive routing in communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
dynamically configuring a network node between a root node and a destination node in a computer network as a region anchor node;
receiving, at the region anchor node, a route request (RREQ) for a target node in a particular network region, the RREQ having been unicast by an originator node of the computer network to the region anchor node via a unicast route, the region anchor node configured to communicate with the originator node and the particular network region of the computer network, the particular network region comprising one or more nodes proximate to the region anchor node;
flooding the RREQ from the region anchor node on an as needed basis, the RREQ limited to the particular network region;

receiving, at the region anchor node, one or more reactive routing route replies (RREPs) returned by the target node in the particular network region;

building, based on the RREPs, one or more region routes from the region anchor node to the target node; and returning the one or more region routes to the originator node to cause the originator node to concatenate the one or more region routes and the unicast route to form a path from the originator node to the target node.

2. The method as in claim 1, wherein the region anchor node is selected by the originator node using historical topological information about the network.

3. The method as in claim 1, further comprising:
wherein the network node within the computer network is dynamically configured as the region anchor node by:
receiving, at the network node, a region anchor advertisement from an existing region anchor node; and
determining, based on the region anchor advertisement, that the network node should be a region anchor node.

4. The method as in claim 1, wherein the network node is dynamically configured as a region anchor node when it has not received a region anchor advertisement for a period of time.

5. The method as in claim 1, wherein a dynamically configured region anchor node is converted back to a network node if the dynamically configured region anchor node determines that the number of proximate region anchor nodes in the network exceeds a threshold value.

6. The method as in claim 1, wherein the unicast route is created and maintained by the originator node.

7. The method as in claim 1, wherein the unicast route from the originator node to the region anchor node is based on an originator directed acyclic graph (DAG) rooted at the originator node, wherein the region anchor node is located within the originator DAG.

8. An apparatus, comprising:
one or more network interfaces to communicate as a region anchor node between a root node and a destination node in a computer network, the network interfaces configured to communicate with the originator node and a region of the computer network, the region comprising one or more nodes proximate to the region anchor node;
a processor coupled to the network interfaces and adapted to execute one or more processes; and
a memory configured to store a process executable by the processor, the process when executed operable to:
dynamically configure the apparatus as a region anchor node;
receive a route request (RREQ) for a target node in a particular network region, the RREQ having been unicast by an originator node to the region anchor node via a unicast route;
flood the RREQ from the apparatus on an as needed basis, the RREQ limited to the particular network region;
receive one or more reactive routing route replies (RREPs) returned by the target node within the particular network region;
build, based on the RREPs, one or more region routes from the region anchor node to the target node; and
return the one or more region routes to the originator node to cause the originator node to concatenate the one or more region routes and the unicast route to form a path from the originator node to the target node.

9. The apparatus as in claim 8, wherein the region anchor node is selected by the originator node using historical topological information about the network.

10. The apparatus as in claim 8, wherein a network node within the computer network is dynamically configured to be the region anchor node by a process that:
receives region anchor advertisement from an existing region anchor node; and
determines, based on the region anchor advertisement, that the apparatus should be a region anchor node.

11. The apparatus as in claim 8, wherein the apparatus is dynamically configured as a region anchor node when it has not received a region anchor advertisement for a period of time.

12. The apparatus as in claim 8, wherein the process when executed is further operable to:
convert from a region anchor node to a network node in response to determining that the number of proximate region anchor nodes in the network exceeds a threshold value.

13. The apparatus as in claim 8, wherein the unicast route is created and maintained by the originator node.

14. The apparatus as in claim 8, wherein the unicast route from the originator node to the region anchor node is based on an originator directed acyclic graph (DAG) rooted at the originator node, wherein the region anchor node is located within the originator DAG.

15. A tangible, non-transitory, computer-readable media having a process encoded thereon, the process when executed by a processor operable to:
dynamically configure a network node between a root node and a destination node in a computer network as a region anchor node;
receive a route request (RREQ) for a target node in a particular network region, the RREQ having been unicast by an originator node to the region anchor node via a unicast route;
flood the RREQ from the region anchor node on an as needed basis, the RREQ limited to the particular network region;
receive one or more reactive routing route replies (RREPs) returned by the target node within the particular network region;
build, based on the RREPs, one or more region routes from the region anchor node to the target node; and
return the one or more region routes to the originator node to cause the originator node to concatenate the one or more region routes and the unicast route to form a path from the originator node to the target node.

16. The tangible, non-transitory, computer-readable media as in claim 15, wherein a network node within the computer network is dynamically configured to be the region anchor node by a process that:
receives region anchor advertisement from an existing region anchor node; and
determines, based on the region anchor advertisement, that the apparatus should be a region anchor node.

17. The tangible, non-transitory, computer-readable media as in claim 15, wherein the process when executed is further operable to:
convert from a region anchor node to a network node in response to determining that the number of proximate region anchor nodes in the network exceeds a threshold value.

* * * * *